United States Patent
Ikeda et al.

(10) Patent No.: US 11,356,003 B2
(45) Date of Patent: Jun. 7, 2022

(54) MANUFACTURING DEVICE FOR MAGNET EMBEDDED CORE

(71) Applicant: Kuroda Precision Industries Ltd., Kanagawa (JP)

(72) Inventors: Masanobu Ikeda, Nagano (JP); Tomoaki Murayama, Nagano (JP)

(73) Assignee: Kuroda Precision Industries Ltd., Kanagawa (JP)

( * ) Notice: Subject to any disclaimer, the term of this patent is extended or adjusted under 35 U.S.C. 154(b) by 0 days.

(21) Appl. No.: 15/734,606

(22) PCT Filed: Nov. 7, 2018

(86) PCT No.: PCT/JP2018/041322
§ 371 (c)(1),
(2) Date: Dec. 3, 2020

(87) PCT Pub. No.: WO2020/095380
PCT Pub. Date: May 14, 2020

(65) Prior Publication Data
US 2021/0234441 A1   Jul. 29, 2021

(51) Int. Cl.
*B23P 19/00* (2006.01)
*H02K 15/03* (2006.01)
*H02K 15/12* (2006.01)

(52) U.S. Cl.
CPC .............. *H02K 15/03* (2013.01); *H02K 15/12* (2013.01); *Y10T 29/53143* (2015.01)

(58) Field of Classification Search
CPC .......... H02K 1/276; H02K 15/03; H02K 1/27; H02K 21/046; Y10T 29/49012; Y10T 29/49009; Y10T 29/49002; Y10T 29/5313; Y10T 29/53143

USPC ......... 29/732, 596, 598, 604, 607, 729, 734, 29/736
See application file for complete search history.

(56) References Cited

U.S. PATENT DOCUMENTS

| | | | |
|---|---|---|---|
| 8,029,720 B2 | 10/2011 | Ogata et al. | |
| 9,712,025 B2* | 7/2017 | Hasegawa | H02K 15/03 |
| 2020/0099278 A1* | 3/2020 | Fukuyama | F16H 25/20 |

FOREIGN PATENT DOCUMENTS

| | | |
|---|---|---|
| EP | 0846538 | 6/1998 |
| JP | H10217258 | 8/1998 |
| JP | 2002301746 | 10/2002 |
| JP | 2011055687 | 3/2011 |
| JP | 2014091220 | 5/2014 |
| JP | 2017007353 | 1/2017 |

(Continued)

OTHER PUBLICATIONS

International Search Report for PCT/JP2018/041322 dated Nov. 29, 2018, 4 pages.

*Primary Examiner* — Thiem D Phan
(74) *Attorney, Agent, or Firm* — Dority & Manning, P.A.

(57) ABSTRACT

To improve the abrasion resistance and releasability of the inner peripheral surfaces of a resin pot chamber, a gate, and the like in a manufacturing device for a magnet embedded core without using cemented carbide, the inner peripheral surface of the resin pot chamber (64), the inner peripheral surface of the gate (50), the outer peripheral surface of the plunger (62), and the like of the manufacturing device (10) for the magnet embedded core are constituted by chromium nitride layers (59, 65, 47) or the like.

6 Claims, 8 Drawing Sheets

(56) References Cited

FOREIGN PATENT DOCUMENTS

| WO | WO2007060892 | 5/2007 |
|---|---|---|
| WO | WO2017179547 | 10/2017 |

\* cited by examiner

MANUFACTURING DEVICE FOR MAGNET EMBEDDED CORE

CROSS REFERENCE TO RELATED APPLICATIONS

This application is the U.S. National Stage entry of International Application Number PCT/JP2018/041322 filed under the Patent Cooperation Treaty having a filing date of Nov. 7, 2018, which is incorporated herein by reference.

TECHNICAL FIELD

The present invention relates to a manufacturing device for a magnet embedded core, and more particularly to a manufacturing device and a manufacturing method for a magnet embedded core used in rotating electric machinery.

BACKGROUND ART

Regarding the manufacture of a magnet embedded core for rotating electric machinery, a technology has been developed which comprises inserting a magnet into each of multiple magnet insertion holes formed in the rotor core along the axial direction, filling each magnet insertion hole with fluid resin, and curing the resin in each magnet insertion hole to fix the magnets to the rotor core.

As such a manufacturing device for a magnet embedded core, there is known a manufacturing device that includes: a support base including a top surface in which a resin pot chamber configured to store molten resin opens out; a separate plate configured to be detachably placed on the top surface of the support base with the rotor core placed on the separate plate, and having a communication passage including a gate and the like configured to communicate the magnet insertion hole and the resin pot chamber with each other; and a plunger movably provided in the resin pot chamber to press-feed the molten resin in the resin pot chamber into the magnet insertion hole via the communication passage.

PRIOR ART DOCUMENT(S)

Patent Document(s)

Patent Document 1: WO2017/179547A1

SUMMARY OF THE INVENTION

Task to be Accomplished by the Invention

In the aforementioned manufacturing device for the magnet embedded core, the outer peripheral surface of the plunger makes sliding contact with the inner peripheral surface defining the resin pot chamber, and therefore, it is contemplated to make the resin pot chamber of cemented carbide, which includes tungsten carbide and the like, to provide abrasion resistance.

However, cemented carbide is expensive and machining thereof is difficult compared to chromium steel or the like. Therefore, manufacturing devices in which cemented carbide is used tend to be expensive.

Particularly, in a case where the resin used to fix the magnets is made of a resin base material consisting of epoxy resin or the like and a filler consisting of inorganic material and mixed in the base resin material, in addition to the wearing of the inner peripheral surface of the resin pot chamber, rubbing abrasion occurs due to the filler on the inner peripheral surfaces of the gate and the like that are exposed to the flow of the molten resin, and therefore, it also becomes necessary to make the members forming the gate and the like of cemented carbide, and this makes the manufacturing device more expensive.

Also, in the case of cemented carbide containing cobalt, chemicals used to clean the manufacturing device may cause cobalt to deposit on the surface of the surface of the base material and decrease the hardness.

It is desired that the inner peripheral surfaces of the gate and the like have excellent releasability with respect to the resin cured in the gate and the like. Regarding this, chromium is known to have excellent releasability with respect to resin, and therefore, it may be conceived to chrome-plate the inner peripheral surface of the gate.

However, a chromium plating layer has a low surface hardness compared to cemented carbide, and lacks abrasion resistance. Also, it is difficult to form a chromium plating layer with an appropriate thickness on the inner peripheral surface of the gate having a small inner diameter. The releasability particularly matters in the magnet embedded core filled with resin at a relatively low pressure because deposition of release agent such as wax added in the resin base material on the molded body surface is not favorable.

A task to be accomplished by the present invention is to provide a manufacturing device for a magnet embedded core in which the abrasion resistance and releasability of the inner peripheral surfaces of the resin pot chamber, the gate, and the like are improved without using cemented carbide.

Means to Accomplish the Task

A manufacturing device for a magnet embedded core according to one embodiment of the present invention is a manufacturing device for a magnet embedded core, the magnet embedded core comprising a rotor core provided with a magnet insertion hole consisting of a through hole opening in both axial end surfaces of the rotor core, a magnet disposed in the magnet insertion hole, and resin filling the magnet insertion hole, the manufacturing device comprising: a support base including one surface in which a resin pot chamber configured to store molten resin opens out; a separate plate configured to be placed on the one surface of the support base with the rotor core placed on the separate plate, and having a communication passage configured to communicate the magnet insertion hole and the resin pot chamber with each other; and a plunger movably provided in the resin pot chamber to press-feed the molten resin in the resin pot chamber into the magnet insertion hole via the communication passage, wherein at least part of inner peripheral surfaces of the resin pot chamber and the communication passage and an outer peripheral surface of the plunger is constituted by a chromium nitride layer.

According to this manufacturing device, the abrasion of the mutually sliding surfaces of the support base and the plunger is reduced and the durability of the same is improved without using cemented carbide.

In the above manufacturing device for the magnet embedded core, preferably, the resin is epoxy resin.

According to this manufacturing device, favorable releasability with respect to the cured epoxy resin is achieved and the productivity is improved.

In the above manufacturing device for the magnet embedded core, preferably, the resin includes a base material resin consisting of epoxy resin in which a filler consisting of inorganic material is mixed.

According to this manufacturing device, even when a filler is mixed in the base material resin, the rubbing abrasion of the support base, the plunger, and the separate plate is reduced and the durability of them is improved.

In the above manufacturing device for the magnet embedded core, preferably, the support base comprises a support base body formed with a pot holding hole and a pot member inserted in the pot holding hole, the pot member defining the inner peripheral surface of the resin pot chamber, and an inner peripheral surface of the pot member is constituted by the chromium nitride layer.

According to this manufacturing device, forming of the chromium nitride layer on the inner peripheral surface of the resin pot chamber can be achieved solely by the pot member, which is a smaller component than the support base body.

In the above manufacturing device for the magnet embedded core, preferably, the communication passage includes a gate having a diameter smaller than that of the resin pot chamber, and an inner peripheral surface of the gate is constituted by the chromium nitride layer.

According to this manufacturing device, since the gate has a small diameter and the inner peripheral surface of the gate is a high hardness surface constituted by the chromium nitride layer, deformation of the gate due to wearing can be reduced.

In the above manufacturing device for the magnet embedded core, preferably, the separate plate includes a gate plate and a cull plate that are detachably placed one over the other, the communication passage includes a gate formed in the gate plate and a cull opening formed in the cull plate, and inner peripheral surfaces of the gate and the cull opening are each constituted by the chromium nitride layer.

According to this manufacturing device, since the inner peripheral surfaces of the gate and the cull opening are high hardness surfaces constituted by the chromium nitride layer, the durability of the gate plate and the cull plate is improved.

In the above manufacturing device for the magnet embedded core, preferably, mutually contacting surfaces of the gate plate and the cull plate are each constituted by the chromium nitride layer.

According to this manufacturing device, the durability of the gate plate and the cull plate is improved, and in addition, even if burrs are formed by the molten resin entering the gap between the gate plate and the cull plate, good releasability of the burrs is achieved.

Effect of the Invention

According to the manufacturing device for the magnet embedded core of the present invention, abrasion resistance of the inner peripheral surfaces of the resin pot chamber, the gate, and the like can be improved without using cemented carbide.

MODES FOR CARRYING OUT THE INVENTION

Figure 1:
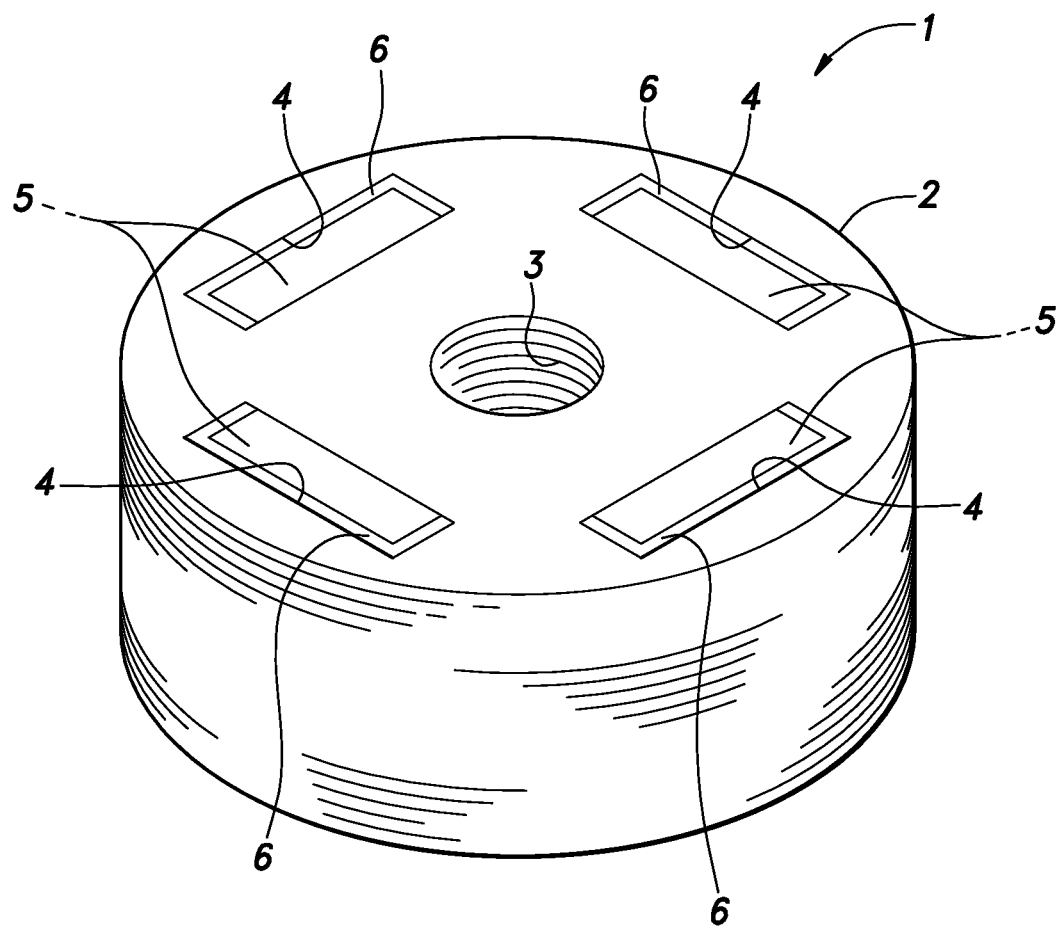
FIG. 1 is a perspective view showing an example of a magnet embedded core manufactured by a manufacturing device according to one embodiment of the present invention.

Preferred embodiments of the present invention are described in the following with reference to the appended drawings.

First of all, an example of a magnet embedded core manufactured by a manufacturing method and a manufacturing device according to one embodiment of the present invention is described with reference to FIGS. 1 and 2.

The magnet embedded core 1 is a component part of rotating electric machinery such as an electric motor, and includes a rotor core 2. The rotor core 2 consists of a laminated iron core formed by stacking a plurality of electromagnetic steel sheets and joining the electromagnetic steel sheets together by using a known joining method (such as crimping, laser welding, gluing, etc.). The rotor core 2 is substantially annular in shape in plan view, and is centrally provided with a shaft hole 3 extending therethrough in an axial direction.

The rotor core 2 is formed with multiple magnet insertion holes 4 each defining a substantially rectangular parallelepiped space. The magnet insertion holes 4 extend through the rotor core 2 in the axial direction, and each open out at both of the end surfaces of the rotor core 2. In the illustrated embodiment, the magnet insertion holes 4 are formed in four locations that are arranged at a regular interval in the circumferential direction of the rotor core 2. However, the magnet insertion holes 4 are not limited to this embodiment, but can be modified in various ways with regard to shape, number, arrangement, etc.

A substantially rectangular parallelepiped shaped magnet 5 is received in each magnet insertion hole 4. The magnet 5 may consist of a permanent magnet (with or without magnetization) such as a ferrite-based sintered magnet or a neodymium magnet, for example. The dimensions of each magnet 5 are slightly smaller than the corresponding dimensions of the magnet insertion hole 4. As a result, a gap is created between the rotor core 2 and the magnet 5 in each magnet insertion hole 4. This gap is filled with resin 6, and each magnet 5 is fixed to the rotor core 2 by the resin 6 filling the gap.

As the resin 6, resin made of a resin base material consisting of thermosetting resin such as epoxy resin in which a filler consisting of inorganic material such as silica or glass is mixed is used.

Figure 2:
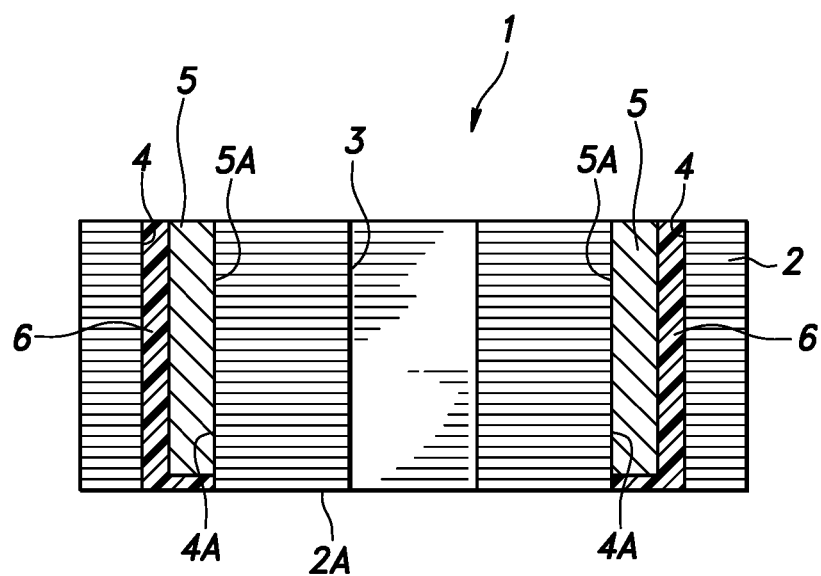
FIG. 2 is a vertical sectional view of the magnet embedded core.

As shown in FIG. 1, the magnet 5 in each magnet insertion hole 4 is inwardly offset (or offset toward the center of the rotor core 2) so that the outer surface 5A of the magnet 5 on the inner side thereof contacts against the inner surface of the magnet insertion hole 4 opposing the outer surface 5A. Thereby, the magnets 5 are uniformly arranged in regard to the radial positioning thereof. This, in cooperation with the magnet insertion holes 4 arranged at regular intervals in regard to the circumferential positioning thereof with respect to the rotor core 2, prevents the magnets 5 from causing any rotational imbalance of the rotor core 2. The magnets 5 may also be offset in the opposite radial direction from that shown in FIG. 1 (or offset away from the center of the rotor core 2).

Next, a manufacturing device 10 for the magnet embedded core 1 of the present embodiment will be described with reference to FIGS. 3 to 7.

The manufacturing device 10 is provided with a press structure that includes multiple vertically extending tie bars 12, a flat plate-shaped fixed platen 16 fixed to the upper parts of the tie bars 12, and a flat plate-shaped movable platen 14 vertically movably supported by the tie bars 12 below the fixed platen 16. The movable platen 14 can be driven vertically by a die clamping device not shown in the drawings. The die clamping device may be based on a known toggle-link mechanism or feed screw mechanism.

An upper member 18 is fixed to the bottom surface of the fixed platen 16. The upper member 18 fixedly supports multiple closure members 20 for the respective magnet insertion holes 4 via respective rods 19 projecting downward from the bottom surface of the upper member 18, and suspends a core pressing member 24 via springs 22. The closure members 20 are provided so as to correspond to the respective magnet insertion holes 4 of the rotor core 2, and are each formed in a substantially rectangular shape in plan view which is larger than the plan view shape of the corresponding magnet insertion hole 4 so that each closure member 20 can close the upper opening of the corresponding magnet insertion hole 4. The core pressing member 24 is formed with through holes 26 which receive the respective closure members 20 in the vertical direction. Note that each closure member 20 may have a substantially rectangular plan view shape slightly larger than each magnet insertion hole 4. Alternatively, the closure member 20 may have a plan view shape which covers multiple adjoining magnet insertion holes 4 to simplify the structure of the device.

A lower member 30 is fixed on the movable platen 14. A support base 32 is mounted on the lower member 30. On the top surface of the support base 32 (the top surface 56A of a later-described support base body 56), a separate plate 36 of a rotor core retaining device 34 is placed detachably and replaceably.

The rotor core retaining device 34 includes a flat plate-shaped separate plate 36 that serves as a tray on which the rotor core 2 is placed and a flat plate-shaped upper plate 38 arranged above the separate plate 36. The separate plate 36 and the upper plate 38 are coupled to each other by engagement between movable locking claws 40 mounted on the separate plate 36 and fixed locking claws 42 mounted on the upper plate 38, and detachably hold the rotor core 2 vertically sandwiched therebetween. The rotor core retaining device 34 with the rotor core 2 sandwiched between the separate plate 36 and the upper plate 38 can be loaded onto and removed from the support base 32 and is portable.

The upper plate 38 is formed with insertion holes 44 vertically extending therethrough at positions aligned with the respective magnet insertion holes 4 of the rotor core 2 such that the closure members 20 may be passed into the corresponding insertion holes 44. The insertion holes 44 may be similarly dimensioned as the through holes 26 formed in the core pressing member 24. The insertion holes 44 and the closure members 20 are accurately aligned by engagement of projections 25 (see FIG. 3) formed on outer peripheral edges of the respective through holes 26 and recesses 45 (see FIG. 3) formed on outer peripheral edges of the respective insertion holes 44 when the movable platen 14 is moved upward.

Figure 4:
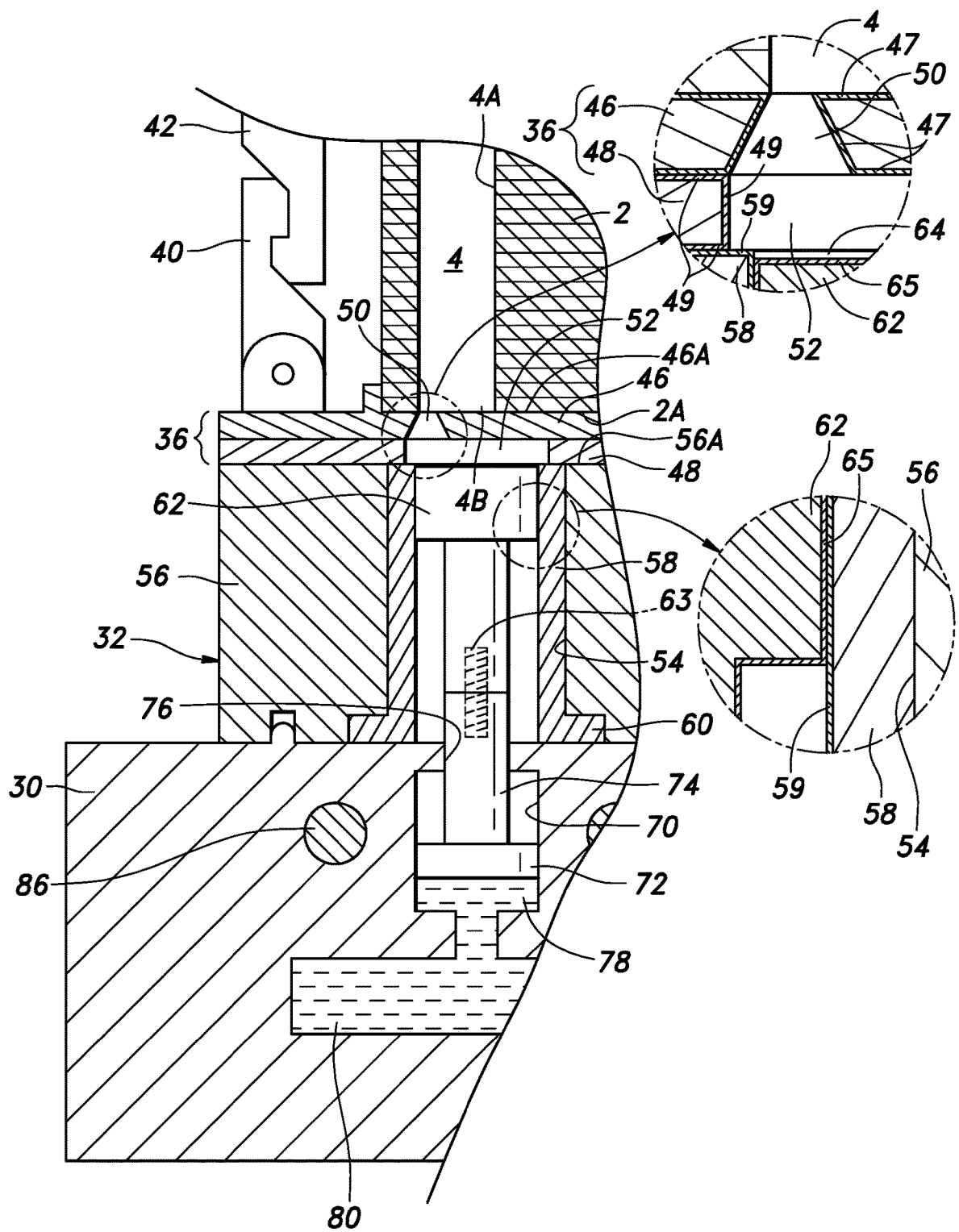
FIG. 4 is an enlarged vertical sectional view of a main part of the manufacturing device for the magnet embedded core according to the present embodiment.

As shown in FIG. 4, the separate plate 36 is formed of a gate plate 46 and a cull plate 48 which are flat plates and are detachably placed one over the other. The gate plate 46 and the cull plate 48 are detachably unified by bolts (not shown) or the like.

The gate plate 46 includes a top surface 46A configured to contact against the lower end surface 2A of the rotor core 2 and gates 50 each configured to individually communicate with a lower end opening 4B of the corresponding magnet insertion hole 4. Each gate 50 serves as a restriction member having a smaller diameter than a later-described pot chamber 64. The cull plate 48 is located under the gate plate 46 and includes cull openings 52 each having a circular cross-sectional shape and communicating with the corresponding gate 50 and the later-described corresponding resin pot chambers 64. Thus, the gates 50 and the cull openings 52 form communication passages that communicate the magnet insertion holes 4 with the resin pot chambers 64.

The support base 32 includes: a support base body 56 having a flat top surface 56A and pot holding holes formed for the respective magnet insertion holes 4 and each having an upper open end and a circular cross-sectional shape; and pot members 58 each having a cylindrical shape and fitted in the corresponding pot holding hole 54. Each pot member 58 has a flange portion 60 at the lower end thereof, and the flange portion 60 is sandwiched between the support base body 56 and the lower member 30 so that the pot member 58 is fixed to them. The upper end of the pot member 58 is a free end so that stress due to thermal expansion will not be applied.

A plunger 62 is provided in the pot member 58 so as to be movable (slidable) in the vertical direction (the axial direction of the pot member 58). The pot member 58 defines an inner peripheral surface of the resin pot chamber 64 (see FIG. 4 and FIG. 6) in a part thereof above the plunger 62. The resin pot chamber 64 is a space to store molten resin, which space has a circular cross-sectional shape concentric with the cull opening 52 and opens out in the top surface 56A of the support base 32. The inner diameter of the resin pot chamber 64 is smaller than the inner diameter of the cull opening 52 and is also smaller than the inner diameter of the pot holding hole 54 by the wall thickness of the pot member 58.

As shown in FIG. 4, the entire surface of the plunger 62 including the outer peripheral surface and the top surface is constituted by a chromium nitride layer 65. The entire surface of each pot member 58 including the inner peripheral surface defining the resin pot chamber 64 and the upper end surface is constituted by a chromium nitride layer 59. The entire surface of the gate plate 46 including the inner peripheral surface of each gate 50, the top surface, and the bottom surface is constituted by a chromium nitride layer 47. The entire surface of the cull plate 48 including the inner peripheral surface of each cull opening 52, the top surface, and the bottom surface is constituted by a chromium nitride layer 49.

Since the entire surfaces of the gate plate 46 and the cull plate 48 are respectively constituted by the chromium nitride layers 47, 49, the bottom surface of the gate plate 46 and the top surface of the cull plate 48, which serve as mutually contacting surfaces, are also constituted by the chromium nitride layers 47, 49.

To achieve required characteristics and durability, it is preferred that the chromium nitride layers 47, 49, 59, 65 each have a thickness of 3 to 4 μm and a Vickers hardness of about 1800 to 2000. The base material of each of the gate plate 46, the cull plate 48, the pot member 58, the plunger 62 may be any metal such as stainless steel other than cemented carbide, and may be sintered metal. The chromium nitride layers 47, 49, 59, 65 can be formed by putting the base material of each of the gate plate 46, the cull plate 48, the pot member 58, and the plunger 62 into a chamber of a vacuum deposition device and performing a general nitriding method to coat the surface with chromium nitride.

In the case where the base material of each of the gate plate 46, the cull plate 48, the pot member 58, and the plunger 62 is stainless steel, it is also possible to generate the chromium nitride layers 47, 49, 59, 65 by a gas nitriding method.

The lower member 30 is formed with cylinder bores 70 corresponding to the respective plungers 62. In each cylinder bore 70, a piston 72 is fitted to be movable in the vertical direction (the axial direction). A piston rod 74 extending upward from each piston 72 passes through a through hole 76 formed in the lower member 30 to protrude into an interior of the pot member 58 and is integrally coupled to the plunger 62 by a screw 63 (see FIG. 4).

The lower member 30 defines a cylinder chamber 78 serving as a pressurizing chamber under each piston 72. The cylinder chambers 78 are individually provided for the respective plungers 62, that is, for the respective resin pot chambers 64, and are connected to an hydraulic pressure generator 84 via a manifold passage 80 formed in the lower member 30 and external piping 82 so that pressure oil is supplied thereto from the hydraulic pressure generator 84. Each piston 72 moves upward to push (pressurize) the corresponding plunger 62 upward via the piston rod 74 when the pressure oil is supplied to the corresponding cylinder chamber 78 from the hydraulic pressure generator 84.

In the lower member 30, electric heaters 86 for heating molten resin 8 in each resin pot chamber 64 are embedded.

Next, a manufacturing process for the magnet embedded core 1 using the manufacturing device 10 according to the present embodiment will be described with reference to FIG. 3 to FIG. 8.

Figure 3:
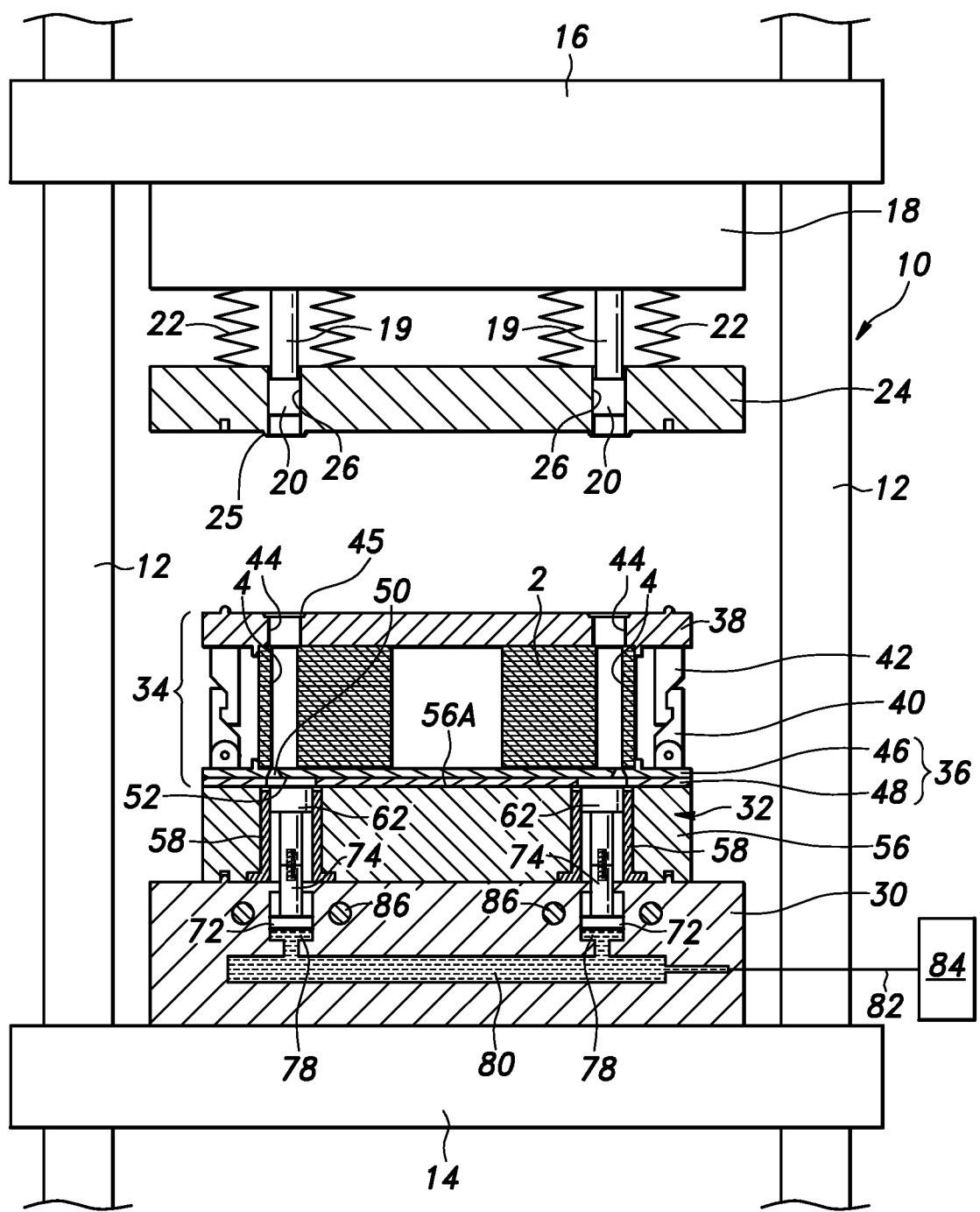
FIG. 3 is a vertical sectional view showing an initial state of the manufacturing device for the magnet embedded core according to one embodiment.

First, as shown in FIG. 3, in a state were the movable platen 14 is lowered, the rotor core retaining device 34 with the rotor core 2 sandwiched between the separate plate 36 and the upper plate 38 is placed on the support base 32. By this placement, each magnet insertion hole 4 is aligned with the corresponding gate 50 to be in communication with the same. Note that the rotor core 2 may be preheated together with the rotor core retaining device 34.

In this state, as the resin and magnet charging step, the solid resin 7 is charged into each magnet insertion hole 4 through the upper opening of the magnet insertion hole 4, and thereafter, the magnet 5 is inserted into each magnet insertion hole 4. The solid resin 7 may be resin formed by molding uncured (before the chemical reaction is initiated by heating in the case of thermosetting resin) powder or granular material resin having relatively small diameters and filling material (filler, additives, and the like) into a columnar or any other desired shape by using a pelleting machine not shown in the drawings, or resin in granular form having a relatively large diameter formed by molding uncured material resin in powder form.

Figure 5:
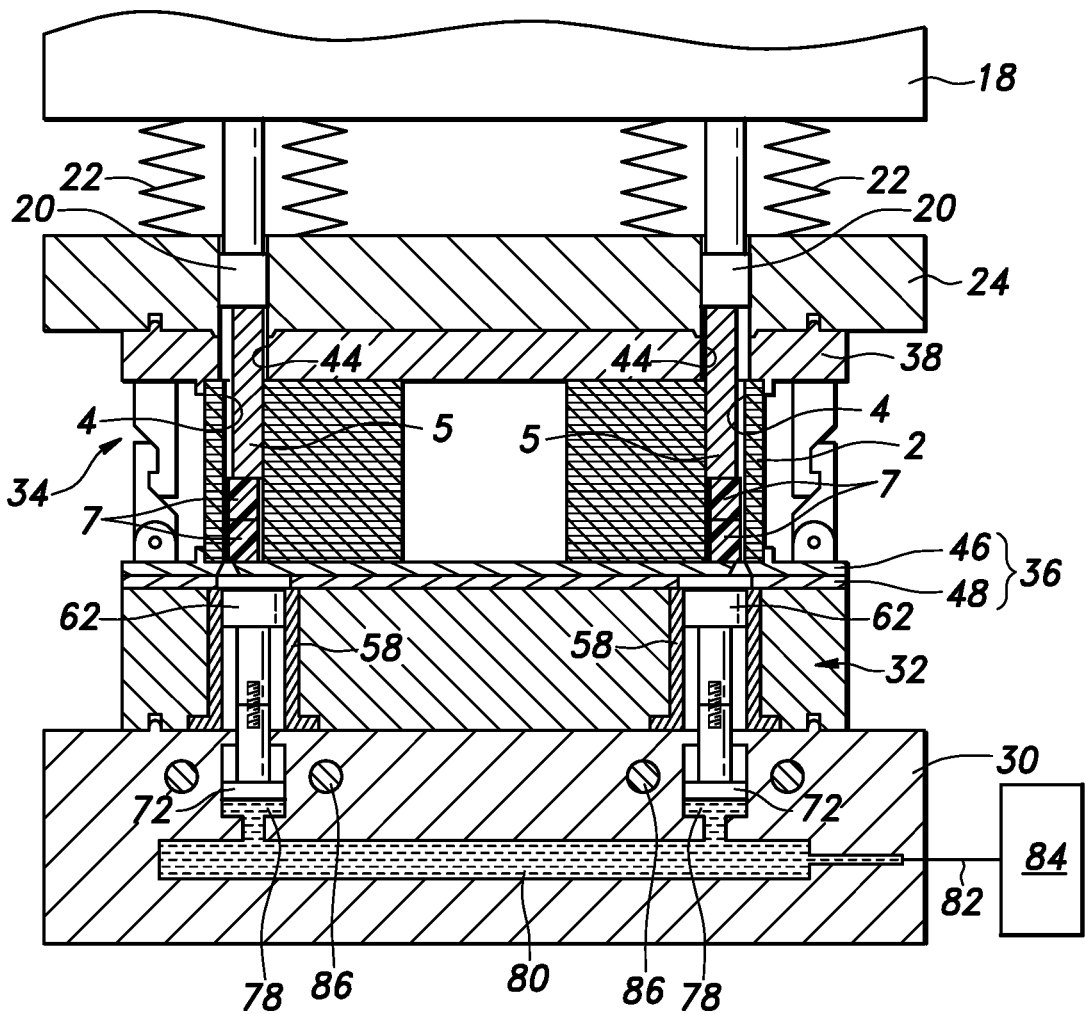
FIG. 5 is a vertical sectional view showing a charging state of solid resin and magnets in the manufacturing device for the magnet embedded core according to the present embodiment.
Figure 6:
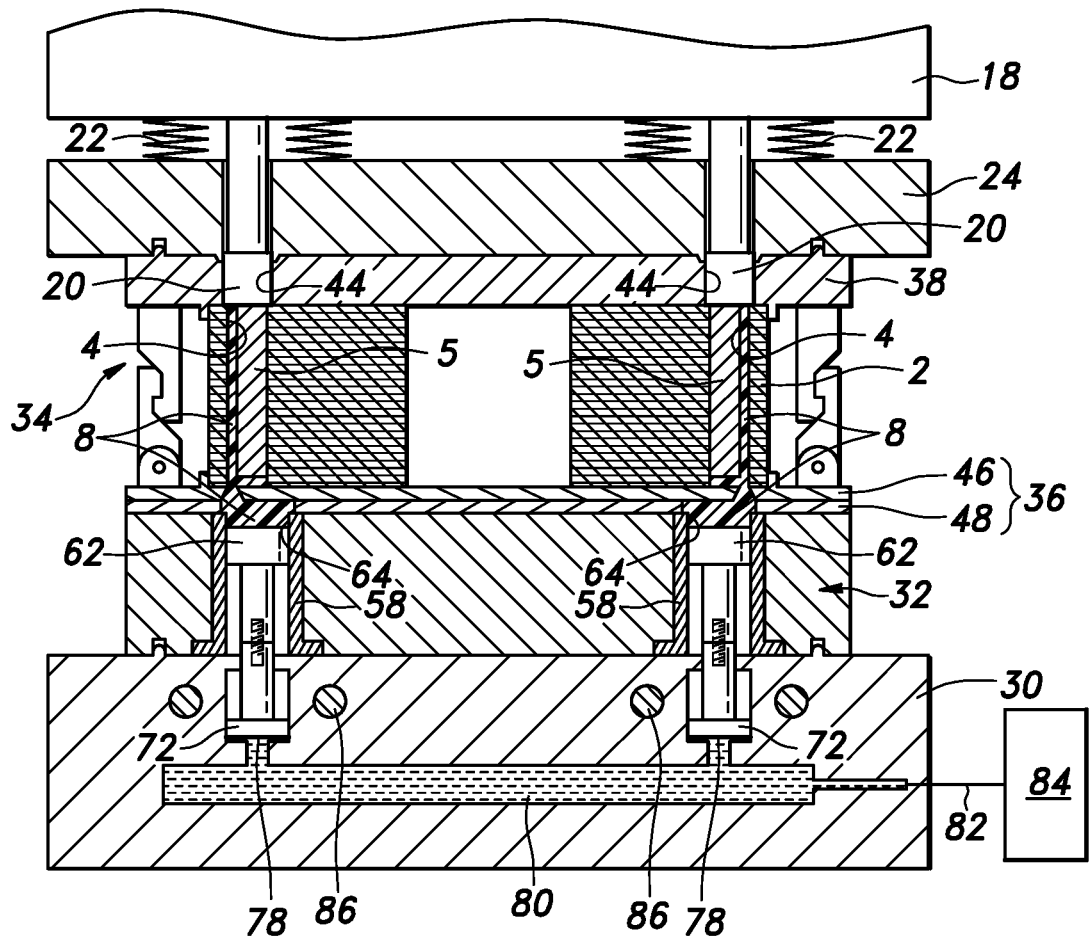
FIG. 6 is a vertical sectional view showing a closure state of magnet insertion holes in the manufacturing device for the magnet embedded core according to the present embodiment.

Subsequently, the movable platen 14 is moved upward and thereby the lower member 30 is moved upward, and as a result, the upper plate 38 contacts against the core pressing member 24, as shown in FIG. 5. As the lower member 30 is moved further upward from this state, as shown in FIG. 6, the springs 22 are compressed and each closure member 20 enters the corresponding insertion hole 44 and pushes the corresponding magnet 5 into the magnet insertion hole 4. Then, the top surface of the rotor core 2 contact against the bottom surface of each closure member 20, whereby the upper opening of each magnet insertion hole 4 is closed by the corresponding closure member 20. In this way, the closing step is performed.

At this time, the solid resin 7 in each magnet insertion hole 4 is melted into molten resin 8 by preheating of the rotor core 2 and heating by the electric heaters 86, and part of the molten resin 8 passes through the gate 50 and the cull opening 52 to flow into the resin pot chamber 64 while pushing down the plunger 62, the piston rod 74, and the piston 72.

Figure 7:
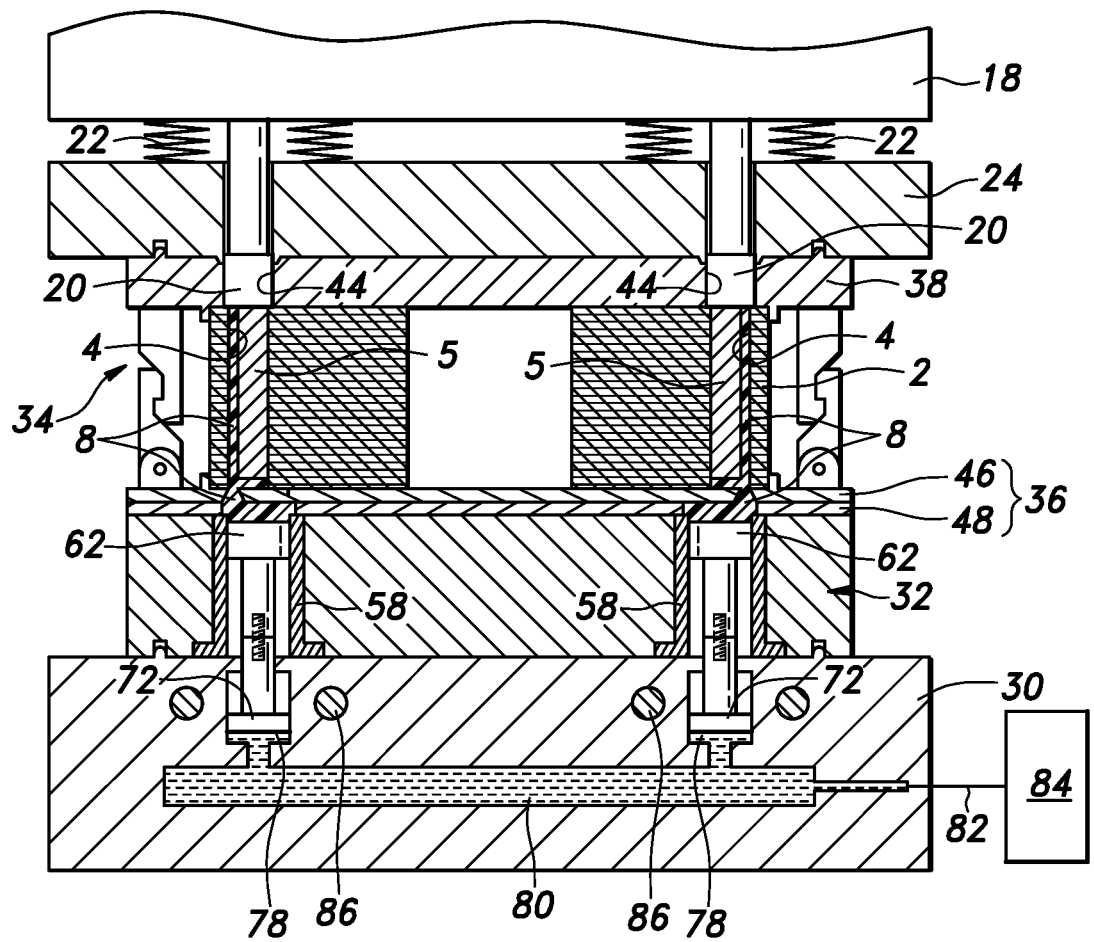
FIG. 7 is a vertical sectional view showing a resin press-feeding and pressure holding state in the manufacturing device for the magnet embedded core according to the present embodiment.

After this, as shown in FIG. 7, as a press-feeding step, hydraulic pressure is supplied from the hydraulic pressure generator 84 to each cylinder chamber 78, whereby each piston 72 is moved upward to cause the plunger 62 to press-feed the molten resin 8 in the resin pot chamber 64 into the magnet insertion hole 4 through the gate 50 and the cull opening 52.

Figure 8:
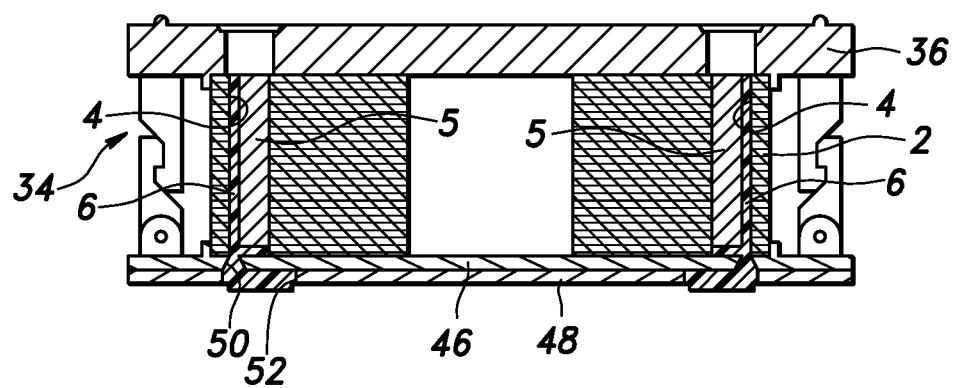
FIG. 8 is a vertical sectional view showing a removal state of the magnet embedded core manufactured by the manufacturing device for the magnet embedded core according to the present embodiment.

After a prescribed pressure holding time has lapsed, the supply of hydraulic pressure to each cylinder chamber 78 is stopped, and then, the movable platen 14 is moved downward, and the rotor core retaining device 34 is taken away from the support base 32 as an unloading step. As shown in FIG. 8, cured resin is affixed to the gates 50 and the cull openings 52 of the unloaded rotor core retaining device 34.

After the curing of the molten resin 8 is completed, as a removing step, the coupling of the separate plate 36 and the upper plate 38 by the movable locking claws 40 and the fixed locking claws 42 is released, and the rotor core 2 is removed from the rotor core retaining device 34. In this removing step, the resin cured in the gate 50 and the cull opening 52 is separated at the gate 50 from the resin 6 in the magnet insertion hole 4, and thereafter, is removed from the separate plate 36 and the upper plate 38 which are separated from each other.

Next, effects of the chromium nitride layers 47, 49, 59, 65 in the above-described manufacturing process of the magnet embedded core 1 will be described.

(1) Since the chromium nitride layer 65 on the outer peripheral surface of the plunger 62 and the chromium nitride layer 59 on the inner peripheral surface of the resin pot chamber 64 have high hardness, they reduce the abrasion of the mutually sliding surfaces of the pot member 58 and the plunger 62. Thereby, the durability of the pot member 58 and the plunger 62 is improved without using cemented carbide.

(2) Since the chromium nitride layer 65 on the top surface the plunger 62, the chromium nitride layer 59 on the inner peripheral surface of the resin pot chamber 64, the chromium nitride layer 47 on the inner peripheral surface of the gate 50, the top surface (the part corresponding to the magnet insertion hole 4), and the bottom surface (the part corresponding to the cull opening 52) of the gate plate 46, and the chromium nitride layer 49 on the inner peripheral surface of the cull opening 52 of the cull plate 48 have high hardness, they reduce rubbing abrasion caused by the molten resin, particularly the molten resin containing filler, that flows while contacting these surfaces. Thereby, durability of the pot member 58, the plunger 62, the gate plate 46, and the cull plate 48 is improved without using cemented carbide.

(3) Unlike a plating layer, the chromium nitride layer 47 can be favorably formed on the inner peripheral surface of the gate 50 even if the gate 50 has a small diameter to make the inner peripheral surface the gate 50 a high hardness surface, thereby reducing the deformation of the gate 50 due to wearing. As a result, the probability that the magnet embedded core 1 may become defective due to gate scars is reduced.

(4) Since the chromium nitride layer 65 on the top surface the plunger 62, the chromium nitride layer 59 on the inner peripheral surface of the resin pot chamber 64, the chromium nitride layer 47 on the inner peripheral surface of the gate 50, the top surface (the part corresponding to the magnet insertion hole 4), and the bottom surface (the part corresponding to the cull opening 52) of the gate plate 46, and the chromium nitride layer 49 on the inner peripheral surface of the cull opening 52 of the cull plate 48 contain chromium, the releasability of the cured resin from these surfaces is improved. Thereby, even if the deposition of the release agent such as wax added in the resin base material on the molded body surface is not favorable, excellent releasability of the cured resin is achieved and the productivity of the magnet embedded core 1 is improved. Particularly, the chromium nitride layer 47 improves the releasability in the case where epoxy resin is used as the base material resin.

(5) Since the chromium nitride layer 59 on the upper end surface of the pot member 58 and the chromium nitride layer 49 on the bottom surface of the cull plate 48 which contact each other and the chromium nitride layer 49 on the top surface (contact surface) of the cull plate 48 and the chromium nitride layer 47 on the bottom surface (contact surface) of the gate plate 46 which contact each other contain chromium, even if the molten resin enters therebetween to form burrs, the releasability of the burrs is good. Thereby, the productivity of the magnet embedded core 1 is improved. Particularly, the chromium nitride layer 47 improves the releasability in the case where epoxy resin is used as the base material resin.

In the above-described manufacturing device for the magnet embedded core, each resin pot chamber 64 is defined by the pot member 58, and therefore, forming of the chromium nitride layer 59 on the inner peripheral surface of the resin pot chamber 64 can be achieved solely by the pot member 58 which is a smaller component than the support base body 56. Therefore, a large chromium nitride processing device is unnecessary to form the chromium nitride layer 59.

In the foregoing, the present invention has been described in terms of preferred embodiments thereof. However, as will be readily appreciated by a person of ordinary skill in the art, the present invention is not limited to such embodiments and may be modified appropriately without departing from the spirit of the present invention.

For example, the pot members 58 are not indispensable, and the resin pot chambers 64 may be directly formed in the support base body 56. In this case, the chromium nitride layer may be formed on the inner peripheral surface of each resin pot chamber 64 formed in the support base body 56.

Though description was made of the illustrated embodiment in which the support base 32 was arranged on a lower side, this was for convenience of explanation, and in the scope of claims, the present invention includes an upside-down case where the support base 32 is arranged on an upper side.

The manufacturing device and the manufacturing method for the magnet embedded core according to the present invention may be applied to a transfer mold type molding device in which the solid resin 7 is charged into the resin pot chamber 64, as described in JP2017-7353A.

Also, not all of the components shown in the foregoing embodiments are necessarily indispensable and they may be selectively adopted as appropriate without departing from the scope of the present invention.

GLOSSARY 1 magnet embedded core
2 rotor core
2A lower end surface
3 axial hole
4 magnet insertion hole
4A inner surface
4B opening
5 magnet
5A outer surface
7 solid resin
8 molten resin
10 manufacturing device
12 tie bar
14 movable platen
16 fixed platen
18 upper member
19 rod
20 closure member
22 spring
24 core pressing member
25 projection
26 through hole
30 lower member
32 support base
34 rotor core retaining device
36 separate plate
38 upper plate
40 movable locking claw
42 fixed locking claw
44 insertion hole
45 recess
46 gate plate
46A top surface
47 chromium nitride layer
48 cull plate
49 chromium nitride layer
50 gate
52 cull opening
54 pot holding hole
56 support base body
56A top surface
58 pot member
59 chromium nitride layer
60 flange portion
62 plunger
63 screw
64 resin pot chamber
65 chromium nitride layer
70 cylinder bore
72 piston
74 piston rod
76 through hole 78 cylinder chamber
80 manifold passage
82 external piping
84 hydraulic pressure generator
86 electric heater

The invention claimed is:

1. A manufacturing device for a magnet embedded core, the magnet embedded core comprising a rotor core provided with a magnet insertion hole including a through hole opening in both axial end surfaces of the rotor core, a magnet disposed in the magnet insertion hole, and resin filling the magnet insertion hole, the manufacturing device comprising:
   a support base including one surface in which a resin pot chamber configured to store molten resin opens out;
   a separate plate configured to be placed on the one surface of the support base with the rotor core placed on the separate plate, and having a communication passage configured to communicate the magnet insertion hole and the resin pot chamber with each other; and
   a plunger movably provided in the resin pot chamber to press-feed the molten resin in the resin pot chamber into the magnet insertion hole via the communication passage,
   wherein at least part of inner peripheral surfaces of the resin pot chamber and the communication passage and an outer peripheral surface of the plunger is constituted by a chromium nitride,
   the separate plate includes a gate plate and a cull plate that are detachably placed one over the other,
   the communication passage includes a gate formed in the gate plate and a cull opening formed in the cull plate, and
   inner peripheral surfaces of the gate and the cull opening are each constituted by the chromium nitride layer.

2. The manufacturing device for the magnet embedded core according to claim 1, wherein the resin is epoxy resin.

3. The manufacturing device for the magnet embedded core according to claim 1, wherein the resin includes a base material resin consisting of epoxy resin in which a filler consisting of inorganic material is mixed.

4. The manufacturing device for the magnet embedded core according to claim 1, wherein the support base comprises a support base body formed with a pot holding hole and a pot member inserted in the pot holding hole, the pot member defining the inner peripheral surface of the resin pot chamber, and
   an inner peripheral surface of the pot member is constituted by the chromium nitride layer.

5. The manufacturing device for the magnet embedded core according to claim 1, wherein the communication passage includes a gate having a diameter smaller than that of the resin pot chamber, and an inner peripheral surface of the gate is constituted by the chromium nitride layer.

6. The manufacturing device for the magnet embedded core according to claim 1, wherein mutually contacting surfaces of the gate plate and the cull plate are each constituted by the chromium nitride layer.

* * * * *